(12) United States Patent
Rivas et al.

(10) Patent No.: US 8,815,765 B2
(45) Date of Patent: *Aug. 26, 2014

(54) DISPERSED METAL SULFIDE-BASED CATALYSTS

(75) Inventors: Guaicaipuro Rivas, Miranda (VE); Jose Cordova, Caracas (VE); Francisco Granadillo, Miranda (VE); Roger Marzin, Miranda (VE); Bruno Solari, Miranda (VE); Luis Zacarias, Miranda (VE)

(73) Assignee: Intevep, S.A., Caracas (VE)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,379

(22) Filed: Feb. 27, 2012

(65) Prior Publication Data

US 2012/0252660 A1 Oct. 4, 2012

Related U.S. Application Data

(63) Continuation of application No. 12/959,475, filed on Dec. 3, 2010, now Pat. No. 8,551,907, and a continuation of application No. 12/113,305, filed on May 1, 2008.

(51) Int. Cl.
| | |
|---|---|
| *B01J 27/02* | (2006.01) |
| *B01J 27/047* | (2006.01) |
| *B01J 27/051* | (2006.01) |
| *B01J 27/049* | (2006.01) |
| *B01J 27/043* | (2006.01) |
| *B01J 27/045* | (2006.01) |
| *B01D 17/05* | (2006.01) |

(52) U.S. Cl.
USPC .......... 502/216; 502/219; 502/220; 502/221; 502/222; 502/223; 516/141; 516/143; 516/181

(58) Field of Classification Search
USPC .......... 502/216, 219–223; 516/141, 143, 181
See application file for complete search history.

(56) References Cited

U.S. PATENT DOCUMENTS

| | | |
|---|---|---|
| 2,435,380 A | 2/1948 | Archibald et al. |
| 3,017,368 A | 1/1962 | Elliott et al. |
| 3,663,431 A | 5/1972 | Wagner |
| 3,773,890 A | 11/1973 | Fox et al. |
| 3,993,592 A | 11/1976 | Van Thillo et al. |

(Continued)

FOREIGN PATENT DOCUMENTS

| | | | | |
|---|---|---|---|---|
| CA | 2 704 875 | * | 5/2010 | ............. C10G 67/06 |
| CA | 2 704 879 | * | 5/2010 | ............. C10G 67/06 |

(Continued)

OTHER PUBLICATIONS

International Search Report for PCT/CA20061001921 mailed Mar. 14, 2007, 7 pgs.

(Continued)

*Primary Examiner* — Patricia L Hailey
(74) *Attorney, Agent, or Firm* — Bachman & LaPointe, P.C.

(57) ABSTRACT

The invention provides a catalyst composition, which includes an emulsion of an aqueous phase in an oil phase, wherein the aqueous phase comprises an aqueous solution containing a group 6 metal and a group 8, 9 or 10 metal. The metals can be provided in two separate emulsions, and these emulsions are well suited for treating hydrocarbon feedstocks.

17 Claims, 5 Drawing Sheets

(56) References Cited

U.S. PATENT DOCUMENTS

| | | |
|---|---|---|
| 4,142,962 A | 3/1979 | Yates et al. |
| 4,303,634 A | 12/1981 | Gatsis |
| 4,401,573 A | 8/1983 | Perrone et al. |
| 4,470,295 A | 9/1984 | Pounds et al. |
| 4,491,639 A | 1/1985 | Happel et al. |
| 4,542,121 A | 9/1985 | Mitchell, III et al. |
| 4,547,321 A | 10/1985 | Stiefel et al. |
| 4,557,821 A | 12/1985 | Lopez et al. |
| 4,592,827 A | 6/1986 | Galiasso et al. |
| 4,596,785 A | 6/1986 | Toulhoat et al. |
| 4,668,483 A | 5/1987 | Ladd et al. |
| 4,748,142 A | 5/1988 | Chianelli et al. |
| 4,820,677 A | 4/1989 | Jacobson et al. |
| 4,824,821 A | 4/1989 | Lopez et al. |
| 4,969,988 A | 11/1990 | Jain et al. |
| 4,973,397 A | 11/1990 | Ho |
| 4,992,403 A | 2/1991 | Takahashi et al. |
| 5,010,049 A | 4/1991 | Villa-Garcia et al. |
| 5,035,793 A * | 7/1991 | Nebesh et al. ............... 208/143 |
| 5,124,024 A | 6/1992 | Krzywicki et al. |
| 5,162,281 A | 11/1992 | Kamo et al. |
| 5,484,755 A | 1/1996 | Lopez |
| 5,565,091 A | 10/1996 | Iino et al. |
| 5,578,197 A | 11/1996 | Cyr et al. |
| 6,004,454 A | 12/1999 | Yuansheng et al. |
| 6,162,350 A | 12/2000 | Soled et al. |
| 6,190,542 B1 | 2/2001 | Comolli et al. |
| 6,635,599 B1 | 10/2003 | Eijsbouts et al. |
| 6,746,597 B2 | 6/2004 | Zhou et al. |
| 6,860,987 B2 | 3/2005 | Plantenga et al. |
| 7,396,799 B2 | 7/2008 | Chen et al. |
| 7,935,244 B2 | 5/2011 | Roy-Auberger et al. |
| 7,951,746 B2 | 5/2011 | Bai et al. |
| 8,092,672 B2 | 1/2012 | Ganguli et al. |
| 8,283,279 B2 * | 10/2012 | Pereira-Almao et al. ..... 502/216 |
| 8,298,982 B2 * | 10/2012 | Pereira-Almao et al. ..... 502/216 |
| 8,304,363 B2 * | 11/2012 | Pereira-Almao et al. ..... 502/216 |
| 2006/0058174 A1 | 3/2006 | Chen et al. |
| 2007/0161505 A1 | 7/2007 | Pereira-Almao et al. |
| 2008/0156700 A1 | 7/2008 | Abulnaga et al. |
| 2009/0200204 A1 | 8/2009 | Mironov et al. |
| 2009/0283447 A1 | 11/2009 | D'Elia et al. |
| 2011/0120908 A1 | 5/2011 | Marzin et al. |
| 2011/0150938 A1 | 6/2011 | Cao et al. |

FOREIGN PATENT DOCUMENTS

| | | |
|---|---|---|
| CN | 1840617 A | 10/2006 |
| EP | 0357295 | 3/1990 |
| EP | 0496592 A1 | 7/1992 |
| WO | 20071059621 | 5/2007 |

OTHER PUBLICATIONS

A. Wang et al. "Hydrodesulfurization of Dibenzothiophene over Proton-Exchanged Siliceous MCM-41 Supported Bimetallic Sulfides," Studies in Surface Science and Catalysis, vol. 154, pp. 2930-2935 (2004).

Espino et al., "Comparative study of WS2 and Co(Ni)/ WS2 HDS catalysts prepared by ex situ/in situ activation of ammonium thiotungstate", Catalysis Letters vol. 90, No. 1, pp. 71-80 (2003).

Hamid A. Al-Megren et al. ":Comparison of bulk CoMO bulk metallic carbide, oxide, nitride, and sulfide catalysts for pyridine hydrodenitrogenation," Journal of Molecular Catalysis A: Chemical 225, Issue 2, pp. 143-148 (2005).

Haoquan Hu et al., "Coal liquefaction with in situ impregnated Fe2(MoS4)3 bimetallic catalyst,"Fuel, vol. 81, Issues 11-12, pp. 1521-1524 (2002).

Huirache-Acuna et al., "Synthesis of Ni-Mo-W sulphide catalysts by ex situ decomposition of trimetallic precursors", Applied Catalysis A: General vol. 304, pp. 124-130 (2006).

Yusuaki Okamoto, "Preparation and Characterization of Co-Mo Model Sulfide Catalysts for Hydrodesulfurization", Journal of Japan Petroleum Institute, vol. 46, pp. 343-358 (2003).

My A. Boutbila et al., "Point defects in the bimetallic sulfides MCr2S4 (M=V, Fe, or Mn): Comparison with CuCrS2 and the corresponding monometallic sulfides," Journal of Alloys and Compounds, Vol. 283, pp. 88-90 (1999).

European Search Report for EP08017357, dated Dec. 8, 2009.

Canadian Office action dated Nov. 4, 2013.

Canadian Office action dated Nov. 6, 2013.

* cited by examiner

DISPERSED METAL SULFIDE-BASED CATALYSTS

CROSS-REFERENCE TO RELATED APPLICATIONS

This application is a continuation of Ser. No. 12/959,457, filed Dec. 3, 2010 (now U.S. Pat. No. 8,551,907), and is also a continuation of Ser. No. 12/113,305, filed on May 1, 2008 (now abandoned).

BACKGROUND OF THE INVENTION

The invention relates to hydroconversion catalysts and, more particularly, to synthesis of a dispersed catalyst which is useful for deep catalytic hydrocarbon conversion.

Various catalytic industrial processes apply supported heterogeneous catalysts. These catalysts contain dispersed metallic active species over high surface area and/or on an acidic support. The deposition of solids in the surface of this kind of catalyst produces an activity loss, and this loss is even greater with heavy and extra heavy feeds to the upgrading procedure.

Additionally there are slurry technologies, which are characterized by the presence of very small catalyst particles effectively dispersed in the medium. Catalyst can be fed as powder (U.S. Pat. No. 4,303,634) or as oil-soluble precursors (U.S. Pat. No. 4,470,295) such as molybdenum naphthenate. However, the need to disperse the catalytic solids or oil-soluble compounds makes for increased cost.

The need exists for an improved hydroconversion catalyst and method for making and using same.

It is therefore the primary object of the present invention to provide such a hydroconversion catalyst and a method for making and using same.

Other objects and advantages will appear below.

SUMMARY OF THE INVENTION

According to the invention, the foregoing objects and advantages have been attained.

According to the invention, a catalyst composition is provided which comprises an emulsion of an aqueous phase in an oil phase, wherein the aqueous phase comprises an aqueous solution containing a group 6 metal (Group VI B, CAS version) and a group 8, 9 or 10 metal (Group VIII B, CAS version).

According to the invention, the catalyst can advantageously be supplied to the feedstock in two separate or different emulsions.

According to a further embodiment of the invention, a method is provided for preparing an at least bi-metallic ultradispersed catalyst comprising the steps of preparing at least one first precursor solution containing a metal salt of a metal of groups 8, 9 or 10; preparing a second precursor solution containing a group 6 metal salt; admixing the first and second precursor solutions with a hydrocarbon feedstock to form separate microemulsions; and admixing the first and second microemulsions to form a bi-metallic microemulsion mixture.

Still further, a process is provided for upgrading a hydrocarbon feedstock, comprising exposing the feedstock to an emulsion of an aqueous phase in an oil phase, wherein the aqueous phase comprises an aqueous solution containing a group 6 metal and a group 8, 9 or 10 metal; and thermally decomposing the emulsion to produce a dispersed catalyst of the group 6 metal and the group 8, 9 or 10 metal, whereby the dispersed catalyst reacts with the feedstock to produce an upgraded hydrocarbon product. According to one embodiment, the residue or other feedstock is exposed to two different emulsions each containing a component of the catalyst. These emulsions can be injected into the reaction zone and exposed to increased temperature which serves to decompose the emulsions and generate the desired dispersed catalyst.

BRIEF DESCRIPTION OF THE DRAWINGS

A detailed description of preferred embodiments of the invention follows, with reference to the attached drawings, wherein.

DETAILED DESCRIPTION

The invention relates to hydroconversion catalysts and, more particularly, to synthesis of a dispersed catalyst which is useful for deep catalytic hydrocarbon conversion, and to use of the catalyst in hydroconversion processes.

A novel and successful form to feed a catalyst precursor is provided. The present invention provides for use of this catalyst in hydroconversion through in situ formation of active phase by thermal decomposition of precursor compounds that contain the metal species; high dispersion level of catalytic particles in the feed; and high activity and better contact between the reactants and active phases. This provides for a greater degree of probability that big molecules which have previously caused diffusion problems will instead be transformed.

The dispersed catalyst of the present invention provides an alternative for upgrading heavy and extra heavy feeds, combining the flexibility of thermal processes with the high performance of hydrogen addition processes.

By using an emulsion system to obtain the catalyst, the emulsions have a specific environment for producing small particles with narrow size distribution and defined composition. In the specific case of water and oil emulsions, the affinity between the organic phase and the feedstock (residue with high viscosity) to be converted, permits a good mixture and facilitates the interactions and reactions that are necessary for the upgrading process.

Water/oil emulsions with very small droplet sizes are of particular interest because each droplet provides a surfactant protected aqueous compartment wherein specific amounts of organometallic salts can be dissolved. These salts are precursors of the final active metallic phase.

According to the invention, a process is provided for producing small particles with narrow size distribution in the sub-micron range. A defined composition from pre-catalytic emulsions is disclosed for use in hydroconversion of heavy oils such as crude oils, heavy crude oils, residual oils and refractory heavy distillates (with an initial boiling point of around 500° C.) into more desirable liquid and gas products.

In accordance with the invention, the dispersed or ultra-dispersed catalyst is provided in the form of a water-oil emulsion wherein the catalyst phase is dissolved in the water droplets in the emulsion. The metal phase advantageously is provided as one metal selected from groups 8, 9 or 10 of the periodic table of elements, and another metal selected from group 6 of the periodic table of elements. These metals can also be referred to as group VIA and VIIIA metals, or group VIB and group VIIIB metals under earlier versions of the periodic table. The metals of each class are advantageously prepared into different emulsions, and these emulsions are useful as feed, separate or together, to a reaction zone with a feedstock where the increased temperature serves to decompose the emulsions and create a catalyst phase which is dispersed through the feedstock as desired. While these metals can be provided in a single emulsion or in different emulsions, both well within the scope of the present invention, it is particularly preferred to provide them in separate or different emulsions.

The group 8-10 metal(s) can advantageously be nickel, cobalt, iron and combinations thereof, while the group 6 metal can advantageously be molybdenum, tungsten and combinations thereof. One particularly preferred combination of metals is nickel and molybdenum.

The method for preparing this emulsion is discussed below. The end result can be a single water-oil emulsion where the water droplets contain both the group 6 and group 8, 9 or 10 metals. Alternatively, two separate emulsions can be prepared and fed to a hydroconversion process, wherein each emulsion contains one of the metallic phases. Either of these systems is considered to fall within the broad scope of the present invention.

It is also within the scope of the invention to utilize more than the two mentioned metals. For example, two or more metals from group 8, 9 or 10 can be included in the catalyst phases of the emulsions.

In further accordance with the invention, it has been found that the catalyst phase is particularly effective when the group 6 metal is provided in the form of a sulfide metal salt. When decomposed during the hydroconversion process, these sulfides form sulfide metal particles which are advantageous in the subsequent hydroconversion processes.

According to the invention, the emulsions are advantageously prepared having a water droplet size of between 0.1 and 200 μm, preferably about 3 μm, a ratio of water to hydrocarbon phase of between 0.08 and 0.50, preferably 0.10 and 0.20, and a droplet size distribution having at least 50 percent of the droplets within 10 microns of the average droplet size.

The emulsions can be prepared using surfactants, if necessary. However, these emulsions have also successfully been prepared relying only upon the natural surfactants within the hydrocarbon phase. Thus, either and both of these types of emulsions are considered to fall within the scope of the present invention.

The hydrocarbon phase can be any suitable hydrocarbon which will be readily miscible with the hydrocarbon feedstock ultimately to be treated. Preferred types of hydrocarbon for use in making the emulsion of the present invention include high vacuum residue gas oil (HVGO), high hydrotreating gas oil (HHGO) and combinations thereof. Of course other hydrocarbon phases can be used.

In order to prepare the catalyst emulsions of the present invention, various methods can be used. However, one particularly preferred method for preparing the emulsions of the present invention involves forming one or more metallic aqueous solutions of the metal salt precursors of the desired metallic phases. This, or these, solutions are then formed into one or more emulsions with a suitable hydrocarbon until water droplets containing the catalyst phase have a desired droplet size and distribution. Such an emulsion is generally stable for a sufficient period of time. If there is any phase separation before the emulsion is used, a small amount of further mixing quickly re-establishes the emulsion.

In order to prepare the metallic aqueous solution, a suitable aqueous phase is obtained and the metal salt precursors are mixed into the aqueous phase. In the case of the group 6 metal, this can advantageously be done in the presence of a sulfuring agent such as $H_2S$, $CS_2$, ammonium sulfide and mixtures thereof. The sulfuring agent can be introduced into the aqueous solution by making a sour water as the aqueous phase, for example by adding sulfur in some dissolvable form to the water solution. Once the group 6 metal is added to this solution, sulfide metals are produced in the reaction system, and these sulfide metals are advantageous in subsequent hydroconversion processes, particularly in helping to provide high conversion rates for heavy fractions of the feedstock to be treated and also in producing excellent hydrodesulphurization (HDS) activity.

The metallic aqueous solution is combined with a hydrocarbon phase such as HVGO (350° C.+), with or without other additives and/or non ionic surfactant or other surfactant compounds, to produce a water in oil emulsion. The salt materials that serve as precursor for the final sulfide metal particles include organometallic compounds such as naphthenates, acetates and other compounds such as oxides of Group 6 and 8, 9 or 10 metals and mixtures thereof. In some instances, if the salt materials are provided as organometallic compounds, then emulsions may not be needed since this catalyst could itself be soluble with the organic phase, that is, the hydrocarbon feedstock. The use of such a catalyst is not outside the scope of the present invention. The water-in-oil emulsion can be prepared for each metal and then mixed, and/or different emulsion component concentrations can be prepared as well.

The aqueous phase can be combined with a sulfuring agent such as $H_2S$, $CS_2$, ammonium sulfide, or mixtures thereof. These sulfuring agents produce sulfide metals in the reactions system. During the hydroconversion process, the feed (distillation vacuum residues) is mixed with one, two or more water in oil emulsions in the proportion desirable to provide desired catalytic activity. The process allows reaching conversion rates of greater than 90% wt of 500° C.+ residue, greater than 88% wt asphalting conversion, and greater than 86% wt conradson carbon conversion.

In further accordance with the invention, a method is provided for synthesizing a bi-metallic particle inside droplets of a water-in-oil emulsion.

As indicated above, the present invention relates to compositions for use in hydroconversion of heavy oils such as crude oils, heavy crude oils, residual oils and refractory heavy distillates.

Catalysts for these processes are synthesized inside the droplets of a w/o-emulsion. This form provides an enhancement in the dispersion of the catalysts through the feedstock, and allows control of particle size, increasing catalyst surface area and improving reaction efficiency.

In hydroconversion processes using the catalyst of the present invention, the hydrocarbon feedstock is fed to a reactor along with the catalyst phase, either as a single emulsion or as a plurality of emulsions each containing one or more of these catalyst metals as desired. These emulsions thermally decompose under hydroconversion conditions and thereby create a very fine particle-size catalyst dispersed throughout the feedstock. This advantageously serves to provide excellent activity in the desired process, be it conversion of heavy fractions, hydrodesulphurization, or any other particular desired reaction.

Suitable hydroconversion conditions according to the invention include:

| Parameter (units) | Range | Preferred |
|---|---|---|
| Total Pressure (bar) | 150-220 | 180-200 |
| H$_2$ partial pressure (bar) | 125-150 | 140-150 |
| Reaction Temperature (° C.) | 440-475 | 448-460 |
| Space Velocity LHSV (h$^{-1}$) | 0.3-0.7 | 0.4-0.6 |
| Gas to Liquid Ratio (SCF/bbl) | 3000-8000 | 4000-6000 |

Figure 1:
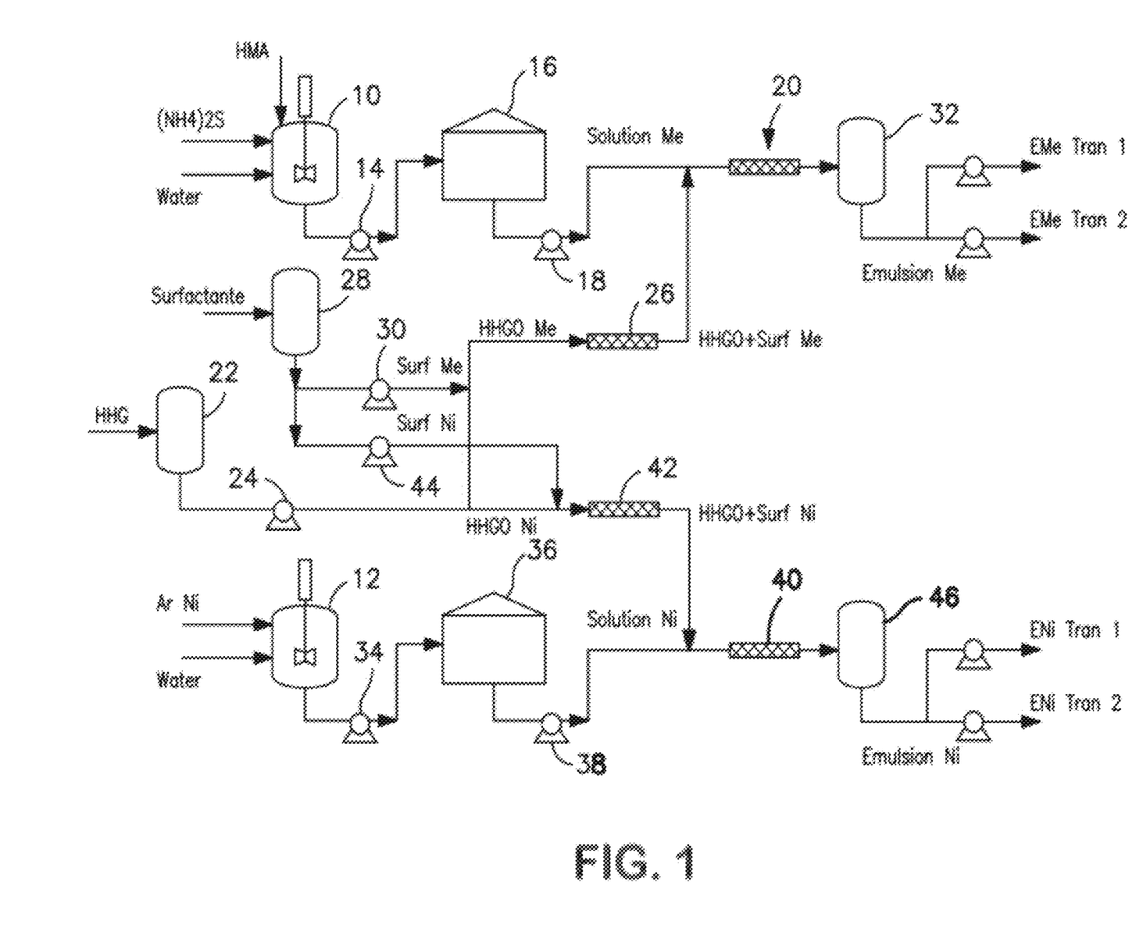
FIG. 1 schematically illustrates a process for making a catalyst according to the invention.

FIG. 1 schematically illustrates a system for making the catalyst system of the present invention.

The process starts with a source of group 6 metal, in this instance shown as ammonium heptamolybdate (HMA) being fed to a mixing tank 10. In addition, a source of nickel is fed to mixing tank 12. Each of these is mixed with a source of water. FIG. 1 also shows a source of sulfur being fed to tank 10 so as to prepare the group 6 metal in sulfide form as desired. The resulting aqueous solution from mixer 10 is fed through a pump 14 to a storage tank 16 and then through a further pump 18 to a mixer 20. At the same time, a hydrocarbon for forming the oil phase of the desired emulsion is provided from a tank 22. This hydrocarbon is fed through a pump 24 to a mixer 26 and then to the same mixer 20 as the group 6 metal aqueous solution. In addition, a surfactant can be provided from a suitable source 28 and fed though a pump 30 to mix with the oil phase in mixer 26. The result is that mixer 20 receives group 6 metal aqueous solution, hydrocarbon phase and, optionally, a surfactant. The mixer imparts sufficient mixing energy that an emulsion having the characteristics desired in the present invention results and is stored in tank 32.

The group 8, 9 or 10 metal and water are mixed in mixer 12 to form an aqueous solution of the group 8, 9 or 10 metal. This aqueous solution is fed to pump 34 and storage tank 36. From storage tank 36 this solution is then passed through a pump 38 to a mixer 40. The hydrocarbon for the oil phase from tank 22 is also fed through pump 24 to mixer 42, and surfactant from tank 28 can be fed through pump 44 to mixer 42, so that the hydrocarbon and optionally the surfactant are mixed and then mixed with the metal aqueous solution in mixer 40 to produce the desired emulsion having characteristics as specified above, and this emulsion is stored in tank 46. The separate emulsions from tanks 32 and tank 46 can then be fed to suitable reactors for hydroconversion of feedstocks as discussed above. FIG. 1 shows emulsions from these tanks being used to feed two separate reactors. Of course, any number of reactors could be fed with this catalyst emulsion phase. Also, while it is within the scope of the invention to feed these emulsions together into a single emulsion for use in treating the feedstock, it is preferred to feed these emulsions to the reaction zone separately.

It should of course be appreciated, as set forth above, that this is only one method for making the catalyst system of the present invention. Other alternatives could include preparing additional emulsions, or forming an emulsion with all metals in a single aqueous phase, or the like. Each of these alterations to the disclosed method is considered to fall within the broad scope of the present invention.

The catalyst system of the present invention is a novel form to prepare and feed catalyst into the reactor. The catalysts are synthesized from aqueous solutions containing metals of group 6 and groups 8, 9 and/or 10 (Ni, Co, Fe, Mo, W, and the like, and mixtures thereof) and an appropriate sulfiding agent such as $H_2S$, $CS_2$, ammonium sulfide, and mixtures thereof. The precursor catalysts in aqueous solution are formed into an emulsion in a hydrocarbon such as High Vacuum Residue Gasoil (HVGO) or High Hydro treating Gasoil (HHGO). The mixture of aqueous solution and hydrocarbon can contain a non-ionic surfactant as well. The resulting water-oil emulsion allows the catalysts to be spread into the feedstock in an ultra-dispersed fashion. Further, a carbonaceous additive can be injected to the reactor to control the fluid dynamic. Carbon additives of many varieties can be used. One suitable example is the type produced using delayed coker coke as raw material. This material is dried, particle size distribution is adjusted to fit between the range 212-850 μm, and the material is calcined in order to generate porosity having a pore size of around 15 Å and to increase the surface area to up to 200 m$^2$/g (measured with $CO_2$).

The following examples illustrate a catalyst preparation method according to the invention.

EXAMPLE 1

Molybdenum Emulsion

An aqueous solution containing catalytic precursors was prepared from ammonium heptamolybdate (AHM) [$(NH_4)_6Mo_7O_{24}.4H_2O$]. The aqueous solution was prepared having a concentration of 1-14 wt % in sour water. For this example, the concentration was 10 wt %. The sour water was prepared using ammonium sulfide [$(NH_4)_2S$] at a concentration of 0.1-14% wt. For this example, the concentration was 0.2 wt %. The AHM reacts with ammonium sulfide to generate soluble oxy-sulfurs.

A w/o emulsion was prepared using a ratio of mass of surfactant to total mass of the emulsion (γ) between 0 and 0.01 and a ratio by mass of oil to combined mass of aqueous solution and oil (α) of between 0.7 and 0.94. The aqueous solution and the oil phase can be formed into an emulsion without surfactants (only natural surfactants contained in the oil, such as resins or naphthenic acids contained in HVGO), or using a non-ionic surfactant with an Hydrophilic-Lipophilic Balance (HLB) greater than 4. The use of surfactant enhances the stability of the emulsion. Of course, other surfactants or mixtures thereof may also be used. The components of the emulsion are mixed using a static mixer and are fed to a reactor. Table 1 preferred ranges for these components followed by those used in this example.

TABLE 1

| Component | (% wt/wt) |
|---|---|
| AHM aqueous solution (1-14%) in sour water (0.2%) | 6.00-30.00 |
| Surfactant | 0-1.00 |
| HVGO/HHGO | 73.00-90.70 |

| Component | (% wt/Wt) |
|---|---|
| AHM aqueous solution | 11.78 |
| Surfactant | 0.90 |
| HVGO/HHGO | 87.32 |

Figure 2A:
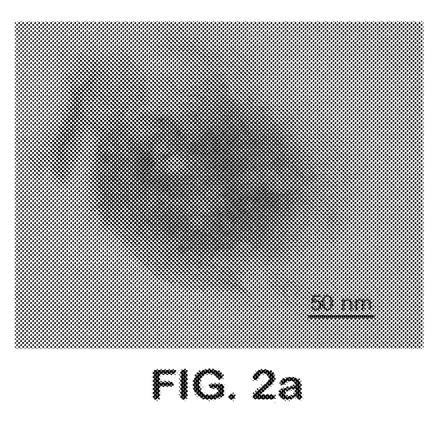
FIGS. 2a and 2b illustrate micrography of catalyst particles according to the invention.
Figure 2B:
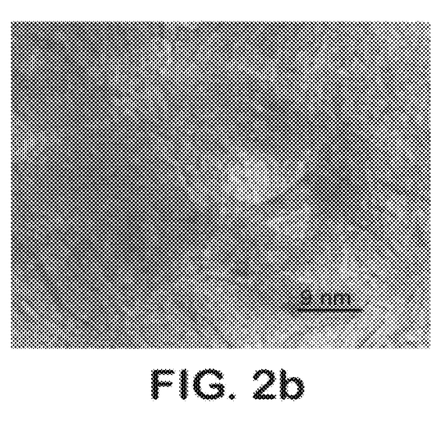

The w/o-emulsion was thermally decomposed at a temperature between 150 and 420° C. and a pressure between 100 and 300 bar to form the active catalyst Mo—S, which has a ratio of S/Mo of greater than or equal to 1.0 and less than or equal to 3. Particle size of the catalyst is in the sub-micron range. FIGS. 2a and 2b show a typical HTEM micrography of catalyst particles, that is, they show the stocked layers of molybdenum sulfide formed in the media during the reaction.

Table 2 presents experimental metal content from a 100 Kg batch of molybdenum emulsion with $\acute{\alpha}=0.879$ and $\gamma=0.006$. This batch was used during a test-run.

TABLE 2

| Date | Hours on stream HOS (h) | Molybdenum (ppmwt) Theoretical | Molybdenum (ppmwt) Experimental | Deviation from theoretical value (%) |
|---|---|---|---|---|
| 3/07 | 91 | 6400 | 5978 | −6.59 |
| 10/07 | 259 | | 6319 | 1.27 |
| 12/07 | 307 | | 6582 | −2.84 |
| 15/07 | 379 | | 6329 | −1.11 |
| 17/07 | 427 | | 5945 | −7.11 |
| 19/07 | 474 | | 6544 | 2.25 |

The emulsions showed thermal stability between room temperature (21° C.) and 80° C. Experimental results have demonstrated that during an incipient-phase separation of the emulsion, any break can be easily reverted by mechanical agitation.

Figure 3A:
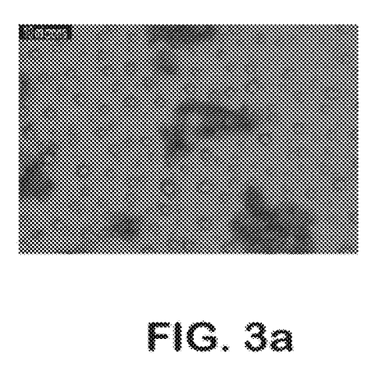
FIGS. 3a and 3b illustrate an optical image of a molybdenum emulsion and the droplet diameter distribution of same, respectively.
Figure 3B:
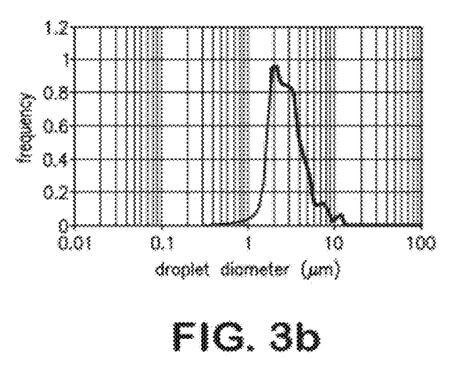

FIGS. 3a and 3b show droplet diameter size distribution and a digitalized optical image of molybdenum emulsion, respectively. The droplets have an average diameter of 3.6 μm and a distribution between 0.3 and 13.4 μm.

EXAMPLE 2

Nickel Emulsion

A water-oil emulsion was prepared from nickel acetate [Ni(CH$_3$COO)$_2$.H$_2$O] aqueous solution (7-14% wt) and HVGO or HHGO, with or without non-ionic surfactant. The relationships γ and $\acute{\alpha}$ were the same as for the w/o molybdenum emulsion, between 0-0.01 and 0.70-0.94 respectively. Table 3 shows the component preferred ranges of the emulsion and their concentration in the mixture, as well as specific values for this example.

TABLE 3

| Component | (% wt/wt) |
|---|---|
| [Ni(CH$_3$ COO)$_2$•H$_2$O] aqueous solution 7-14% (0.2%) | 6.00-30.00 |
| Surfactant | 0-1.00 |
| HVGO/HHGO | 73.00-90.70 |

| Component | (% wt/Wt) |
|---|---|
| [Ni(CH$_3$COO)$_2$•H$_2$o] aqueous solution | 26.31 |
| Surfactant | 0.90 |
| HVGO/HHGO | 72.78 |

Figure 4A:
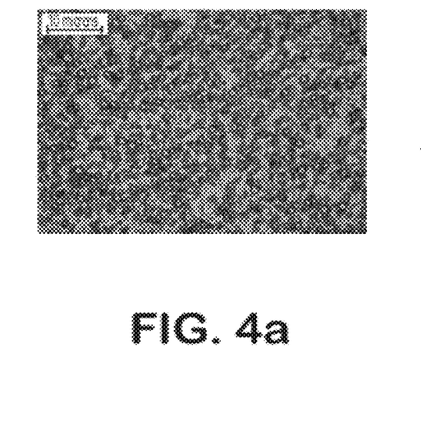
FIGS. 4a and 4b illustrate an optical image of a nickel emulsion and the droplet diameter distribution of same, respectively.
Figure 4B:
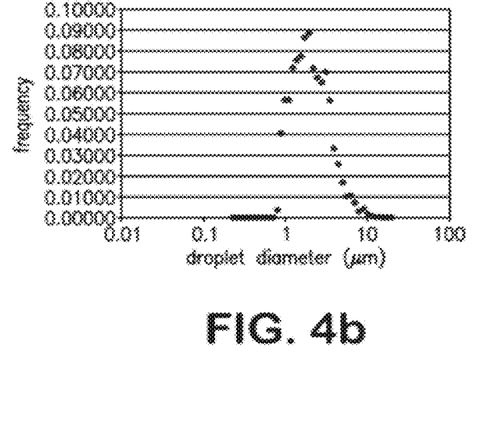

The preparation parameters and control quality methods applied for the water-oil nickel emulsion coincide with those that have been applied for the molybdenum emulsion. FIGS. 4a and 4b show the droplet diameter size distribution and a digitalized optical image of the nickel emulsion, respectively. The droplets have an average diameter of 2.7 μm and a distribution between 1.5 and 7 μm.

Results were obtained for a typical test-run ($\acute{\alpha}=0.879$ and $\gamma=0.006$). The water-oil emulsion was thermally decomposed at temperatures between 150 and 390° C. and pressures between 100 and 300 bar to form the active catalyst Ni—S, which has a ratio of S/Ni of greater than or equal to 0.6 and less than or equal to 2. Particle size was in the sub-micron range. Table 4 shows the nickel content of the different batches of emulsion prepared during a test run.

TABLE 4

| Date | Hours on stream HOS (h) | Nickel (ppmwt) Theoretical | Nickel (ppmwt) Experimental | Deviation from theoretical value (%) |
|---|---|---|---|---|
| 1/07 | 37 | 7300 | 7520 | 3.01 |
| 5/07 | 139 | | 7012 | −3.95 |
| 8/07 | 211 | | 7651 | 4.81 |
| 10/07 | 259 | | 7247 | −0.726 |
| 15/07 | 379 | | 7791 | 6.73 |

EXAMPLE 3

Bi-Metallic Catalyst Synthesis

Figure 5:
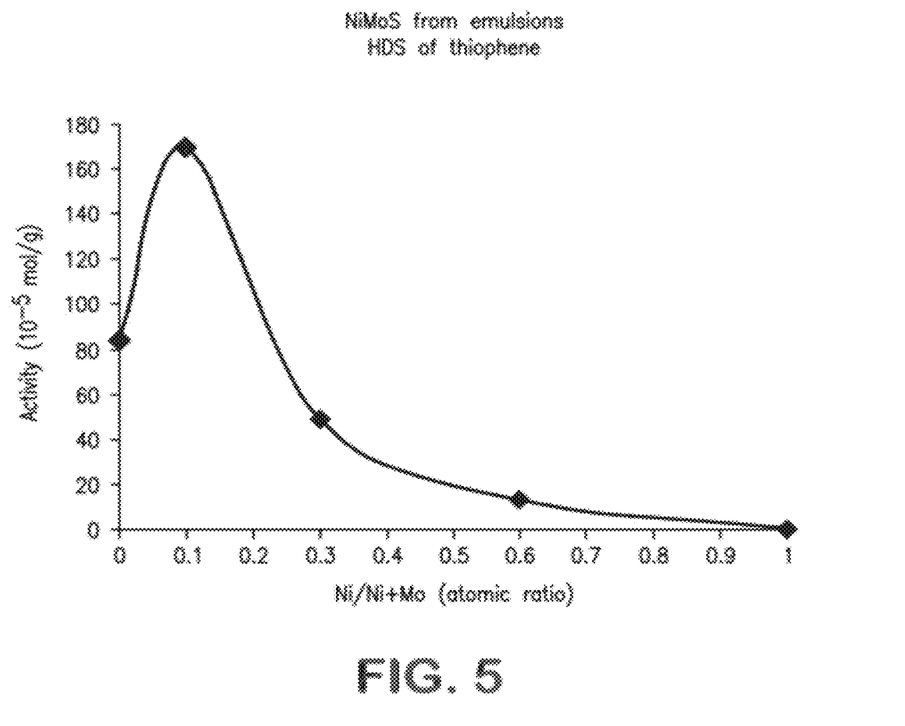
FIG. 5 is a graph showing catalytic activity of an emulsion as a function of ratio of nickel to combined nickel and molybdenum.

The synergy effect of NiMoS supported catalyst is well known. However, this effect is not evident in dispersed catalyst systems. Due to this fact, thermal decomposition of the simultaneous nickel and molybdenum water-oil emulsions was tested. The ratio of Ni/Ni+Mo was changed from 0 to 1 and HDS activity measured at different points in this range. FIG. 5 shows HDS activity results for solids obtained from simultaneous thermal decomposition. It is clear that Ni enhances the performance of Mo catalyst and the maximal synergistic effect was found at a ratio of 0.1. HTEM results evidenced particle size in the range of the previous described particles (Mo—S and Ni—S).

It should be appreciated that a new catalyst system has been provided in accordance with invention which produces fine or ultra-dispersed catalyst particles and thereby greatly enhances hydroconversion activity of the catalyst when exposed to a suitable feed stock. It should also be appreciated that a method for making a suitable emulsion containing the catalyst has been provided, and that a process using this catalyst for hydroconversion has also been provided.

The present disclosure is provided in terms of details of a preferred embodiment. It should also be appreciated that this specific embodiment is provided for illustrative purposes, and that the embodiment described should not be construed in any way to limit the scope of the present invention, which is instead defined by the claims set forth below.

We claim:

1. In a catalyst composition comprising an emulsion of an aqueous phase in an oil phase, wherein the aqueous phase comprises an aqueous solution containing a group 6 metal and a group 8, 9 or 10 metal, wherein the group 6 metal and the group 8, 9 or 10 metal are dissolved in the aqueous phase, the improvement comprising the emulsion having a ratio by weight of oil phase to combined oil and water phase of between 0.70 and 0.94.

2. The composition of claim 1, wherein the group 6 metal is a metal sulfide.

3. The composition of claim 1, wherein the group 6 metal is a salt precursor to a metal sulfide.

4. The composition of claim 3, wherein the salt precursor comprises an organometallic compound.

5. The composition of claim 4, wherein the organometallic compound is selected from the group consisting of naphthenates, acetates and combinations thereof.

6. The composition of claim 3, wherein the salt precursor comprises metal oxides.

7. The composition of claim 1, wherein the group 6 metal is selected from the group consisting of molybdenum, tungsten and mixtures thereof.

8. The composition of claim 1, wherein the group 6 metal is molybdenum.

9. The composition of claim 1, wherein the group 8, 9 or 10 metal is selected from the group consisting of iron, cobalt, nickel and mixtures thereof.

10. The composition of claim 1, wherein the group 8 metal is nickel.

11. The composition of claim 1, wherein the group 6 metal is molybdenum and the group 8 metal is nickel.

12. The composition of claim 11, wherein an atomic ratio of nickel to combined nickel and molybdenum is greater than 0 and less than 0.2.

13. The composition of claim 12, wherein the atomic ratio is 0.1.

14. The composition of claim 1, wherein the oil phase comprises a hydrocarbon selected from the group consisting of high vacuum residue gas oil (HVGO), high hydrotreating gas oil (HHGO) and combinations thereof.

15. The composition of claim 1, wherein the emulsion has an average droplet size of between 0.1 and 20 μm.

16. The composition of claim 1, wherein the emulsion comprises a first emulsion containing said group 6 metal and a second emulsion containing said group 8, 9 or 10 metal.

17. In a catalyst composition comprising an emulsion of an aqueous phase in an oil phase and containing a surfactant, wherein the aqueous phase comprises an aqueous solution containing a group 6 metal and a group 8, 9 or 10 metal, wherein the group 6 metal and the group 8, 9 or 10 metal are dissolved in the aqueous phase, the improvement comprising the emulsion having a ratio by weight of surfactant to total emulsion of greater than 0 and less than or equal to 0.1, and the emulsion having a ratio by weight of oil phase to combined oil and water phase of between 0.70 and 0.94.

* * * * *